United States Patent [19] [11] 4,166,881
Congdon et al. [45] Sep. 4, 1979

[54] TOP COATED PVC ARTICLES

[75] Inventors: Wayne I. Congdon, Indianapolis, Ind.; John J. Mottine, Asbury Park, N.J.; William C. Vesperman, Belair, Md.

[73] Assignees: Western Electric Company, New York, N.Y.; Bell Telephone Laboratories, Incorporated, Murray Hill, N.J.

[21] Appl. No.: 864,159

[22] Filed: Dec. 27, 1977

[51] Int. Cl.[2] .................... B32B 15/08; B32B 27/36; H01B 3/44

[52] U.S. Cl. .................................. 428/463; 156/90; 428/483; 428/918

[58] Field of Search ................ 156/96; 428/483, 911, 428/918, 463

[56] References Cited

U.S. PATENT DOCUMENTS

| | | | |
|---|---|---|---|
| 2,731,060 | 1/1956 | Rowe | 156/90 X |
| 2,994,632 | 8/1961 | Brown et al. | 428/483 X |
| 3,075,863 | 1/1963 | Frey | 156/90 X |
| 3,129,816 | 4/1964 | Bone et al. | 428/483 X |
| 3,264,372 | 8/1966 | Deicher et al. | 428/483 X |
| 3,271,178 | 9/1966 | Nadeau et al. | 428/483 X |
| 3,284,277 | 11/1966 | Bonacci et al. | 428/483 X |
| 3,421,973 | 1/1969 | Kamal et al. | 428/483 X |
| 3,562,095 | 2/1971 | Rahl et al. | 428/483 |

*Primary Examiner*—Harold Ansher
*Attorney, Agent, or Firm*—Peter V. D. Wilde

[57] ABSTRACT

Superior top coatings for PVC are polyesters, especially a polyester blend of a terpolymer of tetramethylene glycol reacted with terephthalic acid, isophthalic acid, and azelaic acid, and a copolymer of ethylene glycol reacted with terephthalic acid and sebasic acid.

12 Claims, 4 Drawing Figures

DUAL EXTENSION COATING LINE

DUAL EXTRUDING HEAD FOR COATING

TOP COATED PVC ARTICLES

BACKGROUND OF THE INVENTION

Polyvinylchloride (PVC) is a widely used plastic in industrial and consumer products. Rigid PVC is used for structural members, piece parts, pipes and tubing, etc. Semirigid PVC is widely used for flooring, siding and other building materials. Flexible PVC is used widely for fabrics, wall coverings and electrical wire insulation. Other uses are too numerous to mention.

Flexible PVC is made using a range of types and amounts of plasticizers. These materials soften the normally rigid PVC and impart the desired degree of flexibility. However, the plasticizers are rarely very soluble in PVC, and they tend to migrate out of the host material and enter the environment. This is an important consequence if the plasticizer material is environmentally unsafe or unwanted. Migration is also a problem from a cosmetic standpoint because the plasticizers commonly used absorb stains during use and migrate back into the surface of the plastic along with the staining substance where they cannot be removed conveniently but are nevertheless visible.

Among the important uses of flexible PVC mentioned earlier is wire insulation. The following description is framed in terms of this use, but it should be understood that virtually all uses for flexible PVC share common circumstances within the context of this invention. Therefore the invention is to be construed as directed toward any article of manufacture comprising plasticized PVC.

Electrical wire insulated with polyvinylchloride (PVC) is used widely for many applications and often for plug-in cords for consumer appliances. It is also used widely for cords connecting telephone station equipment with wall or floor line junctions. In these applications the cords typically have high visibility coupled with high exposure to wear, staining and environmental degradation. Black cords suffer little from staining and only moderately from degradation. However, the increasing demand for cords that are coordinated in color with appliances or interior decor places stringent demands on the PVC insulation. Staining and discoloration are significant problems, especially with equipment that receives heavy use and has a long service life. To reduce inventory necessary to provide a full range of color selection it is sometimes desirable to offer a universal cord with insulation made of clear plastic. Clear plastic insulation has been found to have more market acceptance than black or a neutral color. However, the clear plastic insulation also suffers from the problems enumerated before.

As indicated earlier, staining of light colored and clear PVC cords is often due to the plasticizer required to impart flexibility to the PVC. The stain combines with the plasticizer and migrates back into the plastic where it cannot be removed, even with abrasive type cleaners, but can still be seen.

In accordance with one aspect of this invention the problem of staining is overcome by coating the clear or colored PVC with a plasticizer barrier to prevent interaction between the plasticizer and a potential staining substance. The barrier is a coating of a polyester blend that itself is clear as applied to the cord, and which adheres well to plasticized PVC, is abrasion resistant, flexible, has long term stability against heat and light, can be processed by conventional extrusion, and is itself resistant to stains and discoloration.

While this description has centered about PVC insulated electrical cords, and in particular, telephone mounting cords, it should be understood that the coating materials described and claimed are similarly useful for any PVC product. Top coatings for vinyl upholstery and fabrics are typical of such related uses. These applications often involve the same kind of performance factors for the PVC that are enumerated above.

SUMMARY OF THE INVENTION

Superior top coatings for PVC are polyesters, especially a polyester blend of a terpolymer of tetramethylene glycol reacted with terephthalic acid, isophthalic acid, and azelaic acid, and a copolymer of ethylene glycol reacted with terephthalic acid and sebasic acid.

In an effort to demonstrate the barrier effect tests were conducted with a large number and variety of plastic coating materials. In the course of the investigation other advantages were revealed. For example, it was found that the pull strength of a connector attached to a polyester coated PVC cord was significantly improved over the uncoated cord. During investigations of processing the material it was found that the topcoating of the invention can be extruded in a dual line extrusion system along with the underlying PVC insulation and, when properly quenched, remains essentially clear. This contrasts with the common tendency of extruded plastics to crystallize in a structure that is, to varying degrees, opaque. The top coating was also found to improve the scuff resistance and the crush resistance of the PVC cord. Moreover, the use of a plasticizer barrier allows greater flexibility in the choice of plasticizers used for the PVC. Plasticizers that are hazardous because they migrate to the surface of the plastic and mar furniture finish, or evaporate and thereby contaminate the atmosphere, or are hazardous to the skin upon handling, can in many cases be used safely if the barrier layer is applied. For example, phosphate plasticizers are not only useful for imparting flexibility to PVC, but are known to be effective in retarding smoke that is evolved when PVC burns. However, phosphates are environmentally hazardous. Prevention of environmental contamination by a plasticizer barrier restores the potential of this valuable plasticizer for safe use.

Figure 1B:
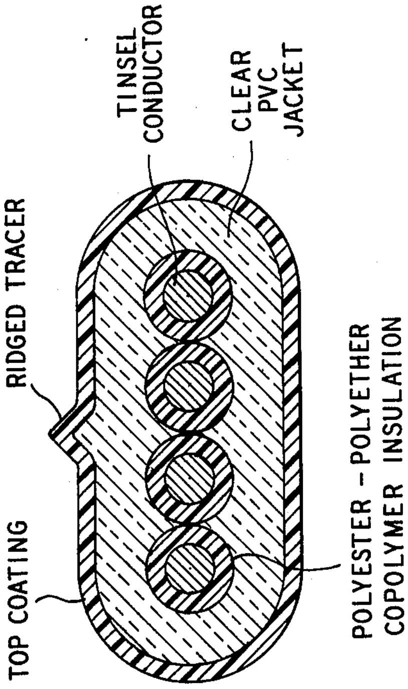
FIGS. 1A-1B are cross sections of typically insulated wire configurations coated with polyester top coats according to one embodiment of the invention.
Figure 1A:
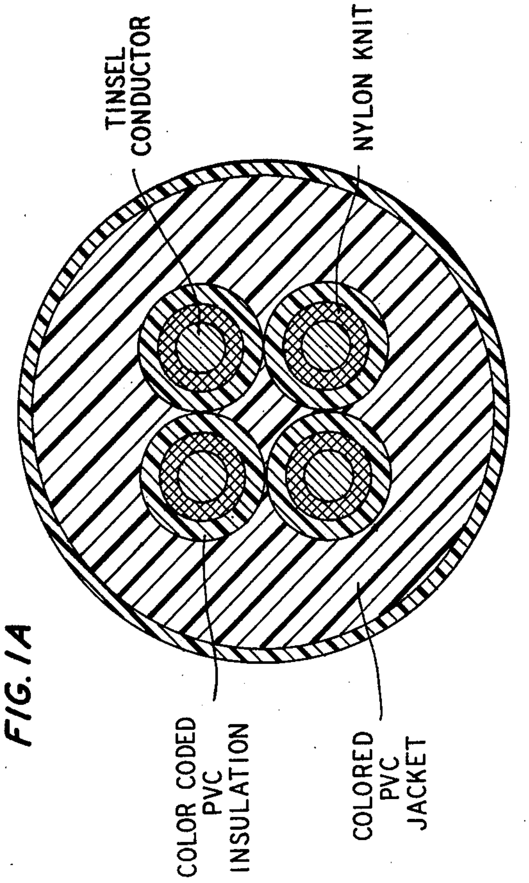

In arriving at the top coating formulation of the invention several different types of polymers were investigated. In addition a wide range of molecular weights were evaluated for each polymer-type studied. The candidates were evaluated on the basis of the following properties:

(1) Barrier to plasticizer migration,
(2) Gloss,
(3) Clarity,
(4) Adhesion to plasticized PVC,
(5) Heat and light stability, (6) Abrasion resistance,
(7) Flexibility.

The types of polymers evaluated consisted of:
(1) Nylons, nylon copolymers, nylon blends,
(2) Polyolefins,
(3) Low plasticized vinyls,
(4) Polyurethanes,
(5) Acrylics, acrylic blends,
(6) Acrylic—vinyl blends,
(7) Polyesters, polyester blends.

The nylons and polyolefins tested were shown to be unsatisfactory as top-coating polymer candidates as a result of poor adhesion performance as evidenced by flex testing experiments, and were not evaluated further. The degree to which plasticizer migration is retarded was measured by soaking top-coated PVC plaques plasticized with DOP (Di-2-ethylhexyl phthalate) in hexane over a 10 day period. The DOP content of the extractant was monitored daily by chromatography. The following table summarizes the barrier properties of top-coat candidates from each polymer class. The greater of percent loss of DOP plasticizer, the less efficient the barrier properties to the top-coat. All samples are normalized against the uncoated control plaque which was rated as 100 percent plasticizer loss.

TABLE 1

| Coating Designation | Description | Percent Plasticizer Loss |
|---|---|---|
| Uncoated Control | Plasticized PVC 60 phr DOP | 100 |
| Low Plasticizer Vinyl-1 | Plasticized PVC 40 phr DOP | 87 |
| Low Plasticizer Vinyl-2 | Plasticized PVC 30 phr DOP | 65 |
| Low Plasticizer Vinyl-3 | Plasticized PVC 20 phr DOP | 43 |
| U-493 | MMW Ether Aliphatic Urethane A | 49 |
| NFX 3699 | MMW Ether Aliphatic Urethane B | 33 |
| U6729 | MMW Ether Aliphatic Urethane C | 48 |
| U10-011 | MMW Ether Aliphatic Urethane D | 45 |
| LR 18-1 | HMW Ether Aliphatic Urethane | 31 |
| U-314 | MMW Ester Aliphatic Urethane A | 42 |
| LR 18-8 | MMW Ester Aliphatic Urethane B | 58 |
| U-344 | HMW Ester Aromatic Urethane | 67 |
| LR 18-3 | HMW Ester Aliphatic Urethane A | 25 |
| LR $18\text{-}4_1$ | HMW Ester Aliphatic Urethane B | 20 |
| LR $18\text{-}4_2$ | MI = 80 HMW Ester Aliphatic Urethane C | 27 |
| LR $18\text{-}4_3$ | MI = 130 HMW Ester Aliphatic Urethane D | 35 |
| LR $18\text{-}4_4$ | MI = 200 HMW Ester Aliphatic Urethane F | 41 |
| Elvacite 2009 | MMW Methyl Methacrylate A | 0* |
| Elvacite 2010 | MMW Methyl Methacrylate B | 0* |
| Elvacite 2041 | HMW Methyl Methacrylate | 0* |
| Elvacite 2042 | HMW Ethyl Methacrylate | 0* |
| Elvacite 2044 | HMW n-Butyl Methacrylate | 14 |
| Elvacite 2013 | LMW Methyl/n-Butyl Copolymer | 21 |
| Plasticized 2009 | 25 phr Santicizer 160 | 29 |
| Elvacite 6014 | MMW Methyl Copolymer | 24 |
| 6014/2042 (2:1) | Acrylic Blend A | 17 |
| Acrylic 17c | Acrylic Blend B | 11 |
| 2041/VUHH (1:2) | Acrylic-Vinyl Blend A | 29 |
| 2042/VUHH (2:1) | Acrylic-Vinyl Blend B | 19 |
| 2009/VUNS (2:1) | Acrylic-Vinyl Blend C | 12 |
| 158-1 (3:2) | Acrylic-Vinyl Blend D | 10 |
| 158-2 (1:1) | Acrylic-Vinyl Blend E | 21 |
| 158-3 (2:3) | Acrylic-Vinyl Blend F | 17 |
| 158-4 (1:3) | Acrylic-Vinyl Blend G | 75 |
| Polyester 17B | Polyester Copolymer A | 0 |
| Polyester 17F | Polyester Copolymer B | 4 |
| Polyester 17H | Polyester Copolymer Blend A & B | 0 |
| PE 200 | LMW Polyester A | 7 |
| PE 222 | LMW Polyester B | 9 |
| Polyester 1671 | LMW Polyester Terpolymer A | 4 |
| Polyester 1296 | LMW Polyester Terpolymer B | 6 |
| Polyester 5126 | MMW Polyester Terpolymer A | 2 |
| Polyester 5146 | MMW Polyester Terpolymer B | 3 |
| Polyester 4980 | HMW Polyester Copolymer A | 0 |
| Polyester 400 | HMW Polyester Copolymer B | 0 |
| Polyester 415 | HMW Polyester Copolymer C | 0 |
| 5126/1296 (1:1) | Polyester Blend A | 3 |
| 5126/1296 (2:1) | Polyester Blend B | 3 |
| 5126/1296 (3:1) | Polyester Blend C | 1 |
| 4980/415 (1:1) | Polyester Blend D | 0 |
| 5126/415 (2:1) | Polyester Blend E | 0 |
| 5126/415 (3:1) | Polyester Blend F | 0 |
| 5126/415 (4:1) | Polyester Blend G | 0 |

*Cracked - must be plasticized or blended with vinyl.

The following conclusions were drawn from the migration data:

(1) Low plasticized vinyl coatings exhibit unacceptable plasticizer migration resistance coupled with significantly limited processing performance and physical properties.

(2) Urethanes reduce migration by approximately 50 percent. As can be seen in samples LR $18\text{-}4_1$–LR $18\text{-}4_4$ (MI increases, MW decreases), the higher molecular weight candidates exhibited improved plasticizer migration resistance as compared to lower molecular weight urethane candidates.

(3) Suitable acrylics, acrylic blends and acrylic-vinyl blends improve migration resistance by as much as 90 percent; barrier properties are improved as MW increases and vinyl content decreases. Such coatings show top-coat potential.

(4) Polyesters proved to be the most impervious polymer-type to plasticizer migration as measured by extraction. HMW polyesters and polyester blends showed as much as 100 percent improvement in barrier properties.

The resistance to cigarette smoke permeation was also investigated as a means for evaluating the stain resistance of various potential top-coat materials, Top-coated plaques were placed in a smoke chamber at a constant smoke density for 96 hours. Samples were then washed in soap and water and rated by the change in yellowness (smoke permeation). The samples were measured for yellowness on a Hunter D25D3 colorimeter with (M) head reflectance attachment. As can be seen in Table 2, the same relative barrier properties are attributed on the candidates as in the extraction work. HMW polyesters and polyester blends proved to be the most effective barrier to cigarette smoke permeation serving as another measure of top-coat effectiveness.

TABLE 2

Cigarette Smoke Staining

| Description | (Plaque) Smoke Pickup |
|---|---|
| Plasticized PVC (60 phr) | 100 |
| Plasticized PVC (40 phr) | 96 |
| Plasticized PVC (30 phr) | 71 |
| Plasticized PVC (20 phr) | 56 |
| MMW Ether Aliphatic Urethane B | 58 |
| HMW Ester Aliphatic Urethane A | 42 |
| HMW Ester Aliphatic Urethane B | 34 |
| Acrylic Blend B | 16 |
| Acrylic/Vinyl Blend C | 24 |
| Acrylic/Vinyl Blend H | 30 |
| Acrylic/Vinyl Vinyl Blend B | 54 |
| Acrylic/Vinyl Blend D | 22 |
| Polyester Copolymer A | 19 |
| Polyester Copolymer C | 11 |
| Polyester Copolymer Blend A & C | 12 |
| MMW Polyester terpolymer A | 5 |
| Polyester Blend B | 6 |
| Polyester Blend E | 0 |
| Polyester Blend F | 0 |

Top-coated clear samples were stained with black ball point pens and red lipstick and allowed to stand at room temperature for 96 hours. Then the samples were wiped with towels soaked in soap and water. Table 3 shows the results of the evaluation. HMW acrylics, acrylic-vinyl blends, polyesters and polyester blends proved to be superior, (0=excellent, 5=unacceptable) (3=marginal).

TABLE 3

Ink and Lipstick Staining

| Description | Relative Rating* Ink | Lipstick |
|---|---|---|
| Plasticized PVC (60 phr) | 5 | 5 |
| PVC (40 phr) | 4 | 4 |
| PVC (30 phr) | 4 | 4 |
| PVC (20 phr) | 4 | 3 |
| MMW Ether Aliphatic Urethane B | 3 | 5 |
| HMW Ester Aliphatic Urethane A | 2 | 5 |
| HMW Ester Aliphatic Urethane B | 3 | 4 |
| Acrylic Blend B | 2 | 0 |
| Acrylic/Vinyl Blend C | 1 | 0 |
| Acrylic/Vinyl Blend H | 1 | 1 |
| Acrylic/Vinyl Blend B | 1 | 0 |
| Acrylic/Vinyl Blend D | 0 | 0 |
| Polyester Copolymer A | 0 | 0 |
| Polyester Copolymer C | 0 | 0 |
| Polyester Copolymer Blend A & C | 0 | 0 |
| MMW Polyester terpolymer A | 0 | 0 |
| Polyester Blend B | 1 | 0 |
| Polyester Blend E | 0 | 0 |
| Polyester Blend F | 0 | 0 |

*0 = virgin, 5 = deeply and permanently stained.

It was concluded from the above testing that HMW polyesters serve most effectively in protecting PVC from the environment. In particular, a blend designated VAR 5825 was found to provide excellent barrier and stain resistant qualities.

VAR 5825 is a code designation for a polyester blend of: (1) a terpolymer of tetramethylene glycol reacted with an acid mixture of 70% terepthalic acid, 10% isopthalic acid, and 20% azelaic acid and (2) a copolymer of ethylene glycol reacted with 50% terephthalic acid and 50% sebasic acid. Obviously the proportions of the reactants can vary within reasonable limits without affecting materially the functional properties of the polyester blend. Specifically, it would be expected that the polyester would exhibit the desired characteristics when the above reactants in each of the polymers are varied over ranges of the order of ±50% of the recited percentages.

Ingredient 1 above will be referred to herein as VAR 5126 and ingredient 2 as VMR 415. Both materials are available from Goodyear Tire and Rubber Co.

The specifics of the preparation of the terpolymer VAR 5126 are contained in U.S. Pat. No. 3,423,281 and details on the preparation of VMR 415 appear in U.S. Pat. Nos. 2,765,250 and 2,765,251.

To demonstrate the importance of the blend ratio of the two constituents various ratios were made and tested from the standpoint of plasticizer barrier effectiveness, staining, and discoloration. The test data appears in the following tables. Table 4 indicates the plasticizer permeation resistance in terms of plasticizer weight gain for seven polyester samples, each measured with respect to three different commonly used plasticizer materials. The first two samples were of the unblended constituents and the remaining samples of blends using various ratios of the constituents ranging from 1:1 to 5:1.

TABLE 4

PLASTICIZER PERMEATION RESISTANCE

| Sample | Plasticizer (% Wt. Gain) Santicizer 141 | Santicizer 148 | Krontex 100 |
|---|---|---|---|
| VFR 5126 | 11.10(10.70)** | 10.79 | 13.21 |
| VMF 415 | 15.70(15.12) | 15.25 | 17.94 |
| (5126/415) | Blends | | |
| 1:1 | 13.92(12.97) | 13.80 | 16.10 |
| 2:1 | 9.32(7.50) | 9.15 | 10.13 |
| 3:1 | 6.66(3.20) | 6.15 | 7.41 |
| 4:1 | 8.90(6.60) | 8.30 | 9.45 |
| 5:1 | 12.05(11.65) | 11.91 | 14.25 |

*Non-oriented 5 mil coating films
**Coating films after orientation

It is evident from the results that blends having ratios of from 2:1 to 4:1 are most effective.

Staining in the same group of samples was measured by exposing the samples to dense cigarette smoke for a period of 48 hours at a temperature of 100° F. The results are given in the following table in terms of an arbitrary index of discoloration.

TABLE 5

CIGARETTE SMOKE PICKUP (48 Hrs., 100 E.)

| Samples* | Δ Yellowness Index (%) |
|---|---|
| VFR 5126 | 36 |
| VMF 415 | 68 |
| (5126/415)Blends | |
| 1:1 | 43 |
| 2:1 | 27 |
| 3:1 | 15 |
| 4:1 | 24 |
| 5:1 | 39 |

*Oriented coating films

Again it is evident that the blends with ratios of 2:1 to 4:1 are most effectve.

Discoloration on aging was measured by an accelerated test in which oven aging was used to simulate long term exposure to air. In this case only one blend was tested, that indicated as VAR 5825, which is a blend with a ratio of VFR 5126/VMF 415 of 3:1. The data is given in the following table. The results are terms of light transmission after aging at 200° F. for 200 hours.

TABLE 6

| LIGHT TRANSMISSION AFTER OVEN AGING** | | |
|---|---|---|
| | (%) Transmission | |
| Sample* | Int. | Final |
| VFR 5126 | 79 | 61 |
| VMF 415 | 83 | 67 |
| VAR 5825 | 85 | 80 |

*Oriented polymer films
**200 hrs. at 200 F.

It is clear that the blend ages better in this test than either of the constituents.

Proper extrusion of the coating polymer is important in obtaining the correct physical requirements of the universal mounting cord. Quench temperature, draw down ratio, line speed and polymer melt temperature play an important role in determining end product properties. To this end an extrusion profile of 350° F. for both the top-coating and the PVC is etilized, which ensures maximum adhesion between the polymers and limits degradation of the vinyl. Optimization of the extrusion parameters enable production of a clear coating at a line speed of 360'/min, quench water temperature of 50 degrees F, and a draw down ratio of 4:1. Upon heat setting or oven aging at 170 degrees F. no large crystal sites are formed, maintaining a clear polyester film. This is unexpected since both the VMF 415 and VFR 5126 coating components become opaque due to growth of large crystals after extrusion. The VAR 5825 coating shows no such growth and maintains clarity. Normally orientation of such polymers is not achieved above the polymer melting point (334° F.), however, the blend achieves a degree of orientation unsuspected from the performance of either of the components.

VAR 5825 can be stabilized against heat and light degradation via a system consisting of one-half percent by weight Irganox 1093, a high molecular weight hindered phenolic antioxidant, and one percent by weight Tinuvin P, a substituted hydroxyphenyl benzothiazole UV absorber. This stabilizer design was selected not only because of its performance but also because both of the ingredients have been tested and dermatologically cleared for usage based on human patch testing. The exact chemical structures are as follows: Irganox 1093 is o-di-n-octadecyl-3, 5-di-tert-butyl-4 hydroxy-benzyl phosphonate; Tinuvin P is 2(2'-hydroxy-5'-methyl phenyl) benzotriazole. However, other suitable stabilizers can be used as well. The barrier properties do not appear to rely on either stabilizer just mentioned but rather on the polyester constituent.

The concentration of stabilizer used was predicated on equaling or improving the heat aging and UV aging characteristics of the underlying PVC material. Oven aging tests over the temperature range of 150 degrees F.–290 degrees F., show the polyester blend (VAR 5825) to yellow at least ten times slower than the vinyl formulation. UV aging via RS sunlamp show the polyester blend very similar or just marginally worse than the vinyl formulations. This can be improved by the addition of more Tinuvin P to the polyester formulation. Physical properties of the coating polymer are shown in Table 7.

TABLE 7

| Physical Properties | | |
|---|---|---|
| Property | VAR 5825 | Method |
| Specific Gravity | 1.26 | ASTM D-792 |
| Shore D Hardness | 59 | ASTM D-785 |
| Tensile Strength (psi) | 3,280 | ASTM D-412 |
| Elongation (%) | 360 | ASTM D-573 |
| LTB (degree C.) | $>-20$ | ASTM D-746 |
| mp (degree C.) | 160 | DSC |
| Torsional Modulus (psi) | | |
| at 23 degrees C. | 6,940 | |
| at $-10$ degrees C. | 44,760 | |
| at $-20$ degrees C. | 68,000 | |
| Stiffness Modulus (psi) | 28,900 | ASTM D-747 |
| Crystallization, degrees C. (onset) | | |
| Melt-Slow Cool | 143 | |
| Fast Quench-Slow Heat | 23 | |

Table 8 shows the chemical resistance of the top-coating material, VAR 5825 to a wide range of substances from household cleaning items such as sodium hypochlorite and perchloro ethylene (dry cleaning fluid); common petroleum products such as, gasoline, ethanol, hexane, mineral oil; plasticizers such as DOP, Santicizer 141, Santicizer 148; and highly active solvents such as acetone, toluene, phenol and benzene. As can be seen the top-coating shows stability to all materials under the severe test conditions while being swollen only by the active solvents and these are not normally encountered in service. Extraction of the plasticizer system through the top-coating or softening of the coatings by common household items seems unlikely based on these results.

TABLE 8

Chemical Resistance
Conditions: 5 mil VAR 5825 film, immersed in concentrated solution, RmT C, wiped dry, weighed.

| Chemical | Exposure Time | (%) Wt. Gain | Appearance |
|---|---|---|---|
| Acetone | 4 weeks | 5.76 | slightly swollen |
| Conc. Ammonium Hydroxide | 4 weeks | <1.00 | unchanged |
| Benzene | 4 weeks | 3.26 | slightly swollen |
| Diethyl Ether | 4 weeks | <1.00 | unchanged |
| DOP (plasticizer) | 4 weeks | 0.00 | unchanged |
| Hexane | 4 weeks | 1.35 | unchanged |
| $H_2O$ | 4 weeks | 0.00 | unchanged |
| 50% Aqueous Ethanol | 4 weeks | <1.00 | unchanged |
| Gasoline | 4 weeks | 0.00 | unchanged |
| Conc. HCl | 4 weeks | <1.00 | stained brown |
| 28% Hydrogen Peroxide | 4 weeks | <1.00 | unchanged |
| Mineral Oil | 4 weeks | 0.00 | unchanged |
| Perchloro Ethylene | 4 weeks | <1.00 | unchanged |
| Phenol | 4 weeks | 8.96 | swollen |
| 10% Sodium Chloride | 4 weeks | <1.00 | unchanged |
| 3½% Sodium Hypochlorite | 4 weeks | <1.00 | unchanged |
| 30% Sulfuric Acid | 4 weeks | <1.00 | unchanged |
| Santicizer 141 (plasticizer) | 1 week | <1.00 | unchanged |
| Santicizer 148 (plasticizer) | 1 week | <1.00 | unchanged |
| Toluene | 4 weeks | 1.80 | unchanged |

Figure 2:
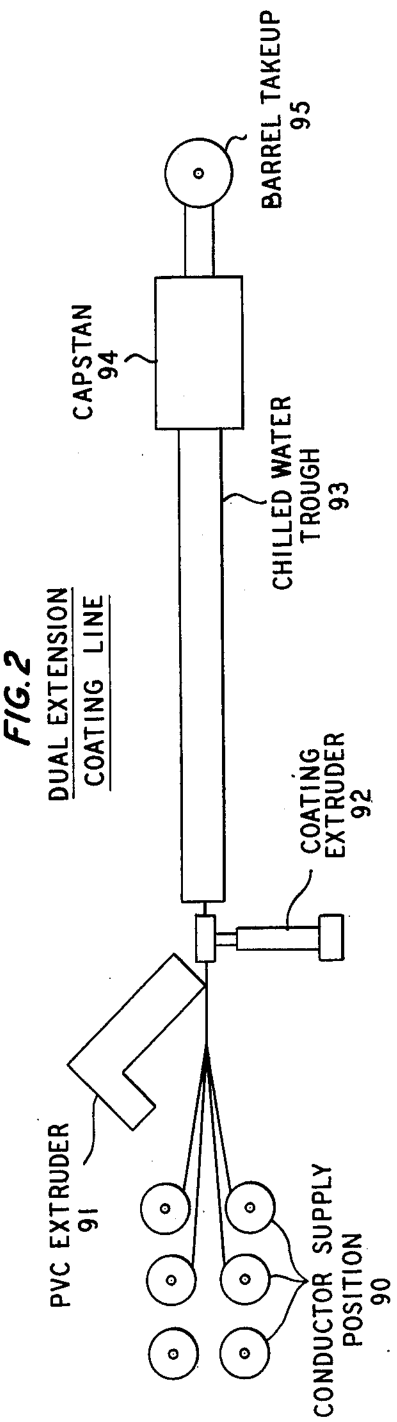
FIG. 2 is a schematic representation of an extrusion line useful for applying the coatings of the inventors.
Figure 3:
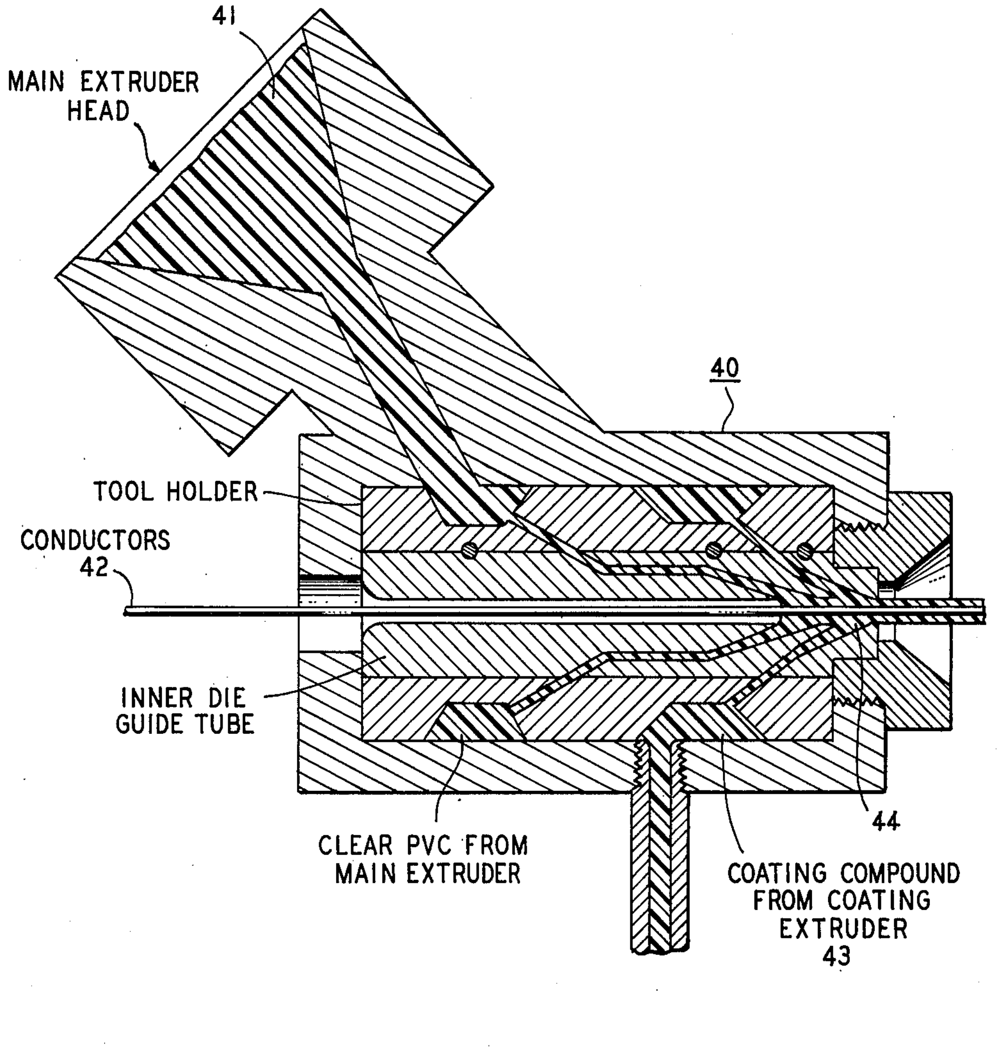
FIG. 3 is a sectional view of the extrusion head of FIG. 2.

To demonstrate the manufacturability of electrical cords coated in accordance with one embodiment of the invention an engineerinng dual extrusion pilot line was developed as shown in FIG. 2 consisting of individual barrel pay-off positions for insulated conductors 90, (Hytrel 7246 silver pigmented insulated tinsel conductors) one PVC extruder 91 and a coating extruder 92 connected to a dual purpose head, a water cooling trough 93 containing chilled quench water (50° F.) and a capstan 94 equipped with a barrel take-up system 95. Dual extrusion of the polyester top-coating polymer utilized two separate extruders, one for metering the clear PVC jacket compound and the other for metering the polyester coating. The PVC extruder design consisted of a 3½ inch diameter machine having a (24/1) L/D barrel and a 4:1 compression ratio screw. The polyester coating extruder consisted of a 1½ inch diameter machine having a (30/1) L/D barrel and a 1.7:1 compression ratio screw. Both extruders were connected to a common head containing a dual cavity tooling design. The dual extruding head is shown in FIG. 3.

The function of the dual cavity head 40 is to simultaneously (1) pressure extrude the PVC jacket compound 41 completely encapsulating the four parallel insulated conductors 42 in the primary cavity, while (2) applying a continuous coating of polyester polymer 43 over the entire PVC jacket conductor substrate in the secondary cavity 44. The die configuration of the primary cavity has an oval shape with an orifice dimension of $0.099 \times 0.199$ inches. The coating die also involves an oval shape design having an orifice dimension of $0.099 \times 0.208$ inches. The coating die was notched in order to develop a ridge in the coating polymer as a tracer for identification of conductors for termination.

Operating conditions for the polyester-PVC dual extrusion coating line were:

TEMPERATURE PROFILES

| Main PVC Extruder | | Polyester Coating Extruder |
|---|---|---|
| Zone 1 (feed) | 350 degrees F. | 330 degrees F. |
| Zone 2 | 350 degrees F. | 340 degrees F. |
| Zone 3 | 350 degrees F. | 350 degrees F. |
| | | Crossover Tube |
| Zone 4 | 350 degrees F. | 365 degrees G. |
| (dual head) | 370 degrees F. | 370 degrees F. |
| Screw Speed | 16 rpm | 25.0 rpm |
| Air Gap-Distance between die and quench water (4) inches | | |
| Line Speed-300 fpm | | |
| Chilled Water 50 degrees F. (in cooling trough) | | |
| PVC Jacket type-458 clear compound | | |
| Polyester Coating-Polyester blend VAR 5825 (Goodyear) | | |

The polyester coating polymer undergoes a fairly rapid transition between liquid and solid phases. Crystallization rate and spherulitic structure of the coating polymer is basically a function of temperature difference and rate of quench. Spherulites are composite structures made up of crystalline (ordered) and amorphous (disordered) regions in which the crystalline regions or crystallites are arranged in an essentially radial fashion with respect to the center of growth. This arrangement results in an extinction pattern in the shape of a Maltese Cross when viewed in a microscope between crossed polaroids. By optimizing the various quench parameters the desired crystallinity and related physical properties of the polymer were obtained.

Three parameters were initially evaluated including the effects of quench temperature and heat aging on the transmission properties of PE films and the differential scanning calorimeteric readings for quenched and slow uncooled samples. The results show that:

(1) A quench temperature of 100 degrees F. or less will generally provide clear polyester. However a quench temperature of less than 50 degrees F. is preferred.

(2) The clear quenched polymer is crystalline, crystallizing at room temperature over a 24 hour period.

(3) Heat aging at higher temperatures does not increase the opacity of the films.

A chilled water quench (50 degrees F.) located approximately four inches from the die was utilized to insure a rapid quench of the coating polymer. This parameter was utilized to reduce the size of the spherulites formed in order to assure a clear flexible coating.

The polyester coating polymer being a hydroscopic material will readily absorb water vapor from the atmosphere. The polymer during extrusion will undergo substantial reduction in melt viscosity when not properly dried.

In order to characterize the polyester VAR 5825 for the effect of moisture, residence time and melt temperature were evaluated via capillary rheometer.

A number of points were obvious:

(1) The pellets must be dry and kept dry to insure against severe process degradation. (2) Long residence time is no problem for dry materials. (3) The melt temperature should be 176 degree C. or higher for sample flow out.

When wet polymer is used the reduction in melt viscosity of the polymers causes a wide variation in polymer delivery from the coating extruder and an imbalance of hydrodynamic pressures in the die cavity between both the type 458 PVC jacket and polyester coating polymer. As a result, extreme variations in coating thickness including partial starving out as well as over application of the coating polymer is realized. In addition, a substantial reduction in melt viscosity and melt pressure of the coating polymer necessitates a significant increase in coating polymer delivery to supplement coating which over penetrates and fuses into the PVC interface. Therefore, it is important to extrude a dry polymer in order to develop and maintain the desired melt viscosity profile. By maintaining a balance of melt pressures between the jacket compound and the polyester coating polymer in the secondary cavity, in conjunction with proper quenching of the extrudate from the die, a clear flexible coating having a thickness of ($0.003 \pm 0.002$) inches was consistently achieved. From this work it is estimated that this technique is easily capable of producing coatings with a thickness in the range 0.001 to 0.005 inches.

The coated clear mounting cord exhibited significant improvement in both physical properties and mechanical performance as compared to that of the uncoated clear mounting cord design.

One piece ($6 \times 4$) plug pull-out strength was measured for both coated and uncoated cordage. This test utilizes a continuous increasing load on a terminated plug. The coated cordage exhibited a pull-out strength of 41 pounds as compared to 33 pounds for the uncoated cordage. This increase in pull-out strength is attributed to the resistance to cold flow, increased tensile properties and hardness of the coating polymer.

A comparison of floor scuff resistance and twist resistance of coated and noncoated cords was performed. The coated cord during scuff resistance testing obtained 4394 cycles as compared to 2540 cycles for the uncoated cord before conductor failure. Twist performance of the coated vs. noncoated cordage resulted in 1373 cycles as compared to 888 cycles before conductor failure. The top-coated cordage demonstrated approximately a 54 percent improvement in twist resistance and 72 percent improvement in scuff resistance over the uncoated cordage.

A comparison of crush resistance of coated vs. uncoated cordage demonstrated, using instron techniques, an improvement of 75 percent over that of the uncoated cordage.

In addition the clear top-coated mounting cord construction was dermatologically acceptable by the conventional environmental test standard.

Extensive evaluation of candidate flame retardant plasticizer systems demonstrated that alky diaryl phosphates exhibit superior vertical burn performance as compared to other systems tested. A new clear PVC jacket compound was developed utilizing about 30% by weight of an alky diaryl phosphate (2-ethylhexyl diphenyl phosphate-Santicizer 141) as the sole plasticizer. The new flame retardant compound exhibited improved low temperature brittleness, oxygen index and heat stability.

As indicated earlier the use of a top-coating enables more flexibility in the choice of the plasticizer used for the polyvinylchloride. For example, even though phosphate plasticizers may be environmentally hazardous, (especially where the phosphate constituent comprises more than 20% of the overall composition) a coated platicized product according to the invention is completely safe. Moreover, as just indicated, phosphate impart an effective degree of flame retardancy to the vinyl.

Various additional modifications and extensions of this invention will become apparent to those skilled in the art. All such variations and deviations which basically rely on the teachings through which this invention has advanced the art are properly considered to be within the spirit and scope of the invention.

What is claimed is:

1. An article of manufacture comprising plasticized polyvinylchloride with a surface coating of a polyester blend of a terpolymer of tetramethylene glycol reacted with terepthalic acid, isopthalic acid, and azelaic acid, and a copolymer of ethylene glycol reacted with terepthalic acid and sebasic acid.

2. The article of claim 1 in which the polyester coating is a clear coating.

3. The article of claim 2 in which the plasticizer comprises a phosphate comound.

4. The article of claim 3 in which the phosphate compound comprises more than 20% of the vinyl composition.

5. The article of claim 1 in which the ratio of terpolymer to copolymer is in the range of 2:1 to 4:1.

6. The article of claim 5 in which the terpolymer contains the recited constituents in amounts of approximately 70%, 10% and 20% respectively and the copolymer contains the recited constituents in amounts of approximately 50% and 50% respectively.

7. The article of claim 6 in which each recited percentage may vary by ±50% of that percentage.

8. An electrical conductor comprising a conductor wire insulated with a material comprising polyvinylchloride and coated with a polyester blend of a terpolymer of tetramethylene glycol reacted with terepthalic acid, isopthalic acid, and azelaic acid, and a copolymer of ethylene glycol reacted with terepthalic acid and sebasic acid.

9. The electrical conductor of claim 8 in which the terpolymer contains the recited constituents in amounts of approximately 70%, 10% and 20% respectively and the copolymer contains the recited constituents in amounts of 50% and 50% respectively.

10. The electrical conductor of claim 8 in which each recited percentage may vary by ±50% of that percentage.

11. The electrical conductor of claim 8 in which the polyester blend coating is a clear coating.

12. The electrical conductor of claim 11 in which the polyvinylchloride material is essentially clear.

* * * * *

UNITED STATES PATENT AND TRADEMARK OFFICE

CERTIFICATE OF CORRECTION

PATENT NO. : 4,166,881

DATED : September 4, 1979

INVENTOR(S) : Wayne I. Congdon, John J. Mottine and William C. Vesperman

It is certified that error appears in the above-identified patent and that said Letters Patent are hereby corrected as shown below:

Column 3, line 23, "to" should read --of--; line 58, TABLE 1, "Urethane F" should read --Urethane E--. Column 5, line 2, "on" should read --to--; line 18, TABLE 2, "Vinyl Vinyl" should read --Vinyl--. Column 6, line 51, TABLE 5, "100 E" should read --100 F--; line 63, "effectve" should read --effective--. Column 7, line 22, "etilized" should read --utilized--. Column 10, line 24, "degree" should read --degrees--. Column 11, line 29, "phosphate" should read --phosphates--.

Signed and Sealed this

*First* Day of *April 1980*

[SEAL]

*Attest:*

SIDNEY A. DIAMOND

*Attesting Officer* *Commissioner of Patents and Trademarks*